SYSTEM FOR COMPENSATING FOR TAPE SKEW AND GAP SCATTER

Filed Oct. 23, 1961 3 Sheets-Sheet 1

INVENTOR:
Richard K. Gerlach
By Louis A. Kline
John J. Matlago
Richard J. Lague
His Attorneys

SYSTEM FOR COMPENSATING FOR TAPE SKEW AND GAP SCATTER

Filed Oct. 23, 1961 3 Sheets-Sheet 2

INVENTOR:
Richard K. Gerlach

By Louis A. Kline
John J. Matlago
Richard J. Rengel
His Attorneys

SYSTEM FOR COMPENSATING FOR TAPE SKEW AND GAP SCATTER

Filed Oct. 23, 1961 3 Sheets-Sheet 3

INVENTOR:
Richard K. Gerlach
Louis A. Kline
By John J. Marlago
Richard J. Rogers
His Attorneys United States Patent Office 3,264,622

Patented August 2, 1966

3,264,622

SYSTEM FOR COMPENSATING FOR TAPE SKEW AND GAP SCATTER

Richard K. Gerlach, Gardena, Calif., assignor to The National Cash Register Company, Dayton, Ohio, a corporation of Maryland Filed Oct. 23, 1961, Ser. No. 146,827
12 Claims. (Cl. 340—174.1)

Figures 1, 1A:
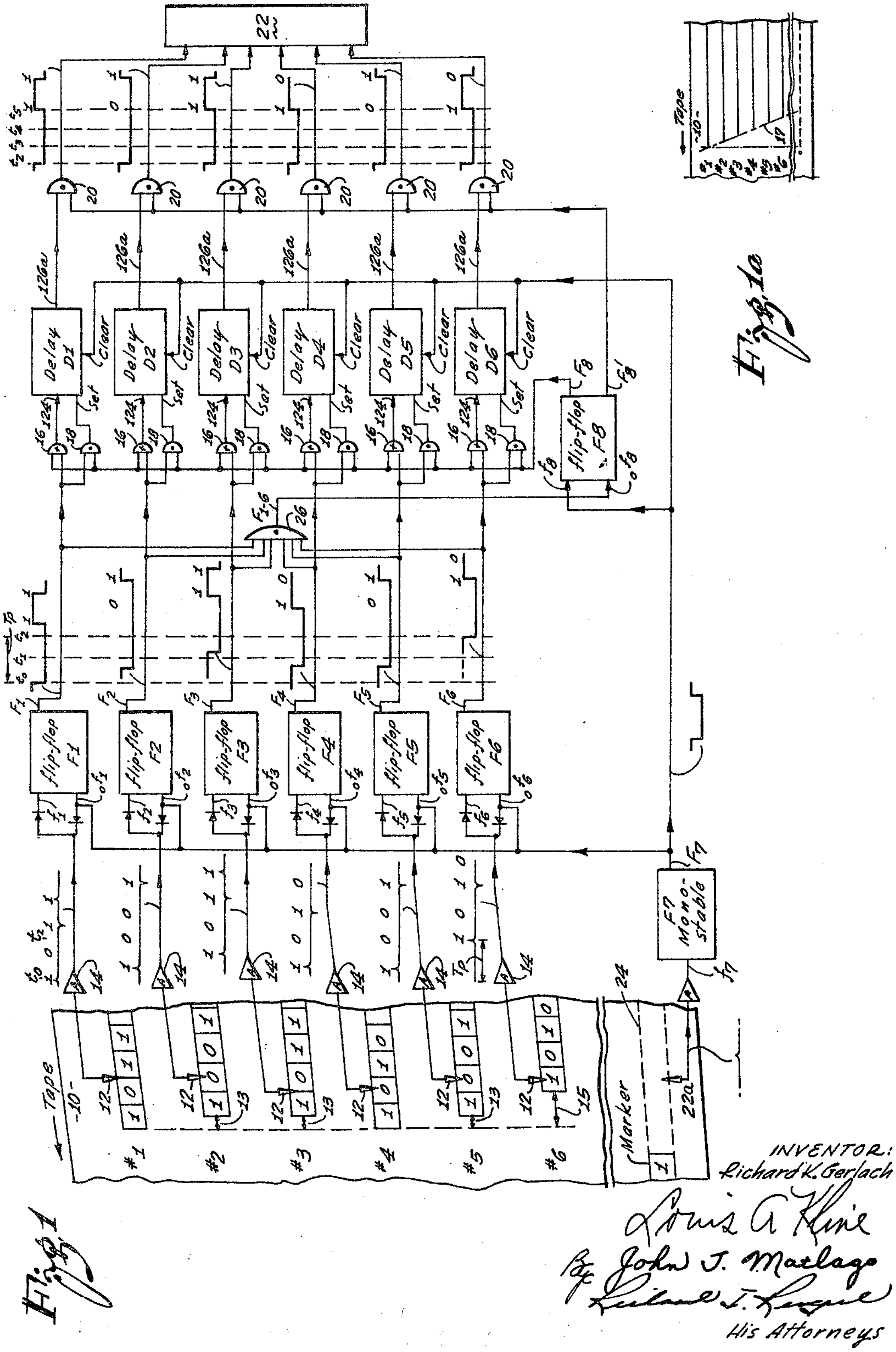

The present invention is directed to systems for concurrent reproduction of data and more particularly to systems for concurrent reproduction of data in parallel data tracks on a record medium.

The need for large capacity storage in computing systems is well known and a continuous effort has been placed on increasing the data transfer rate of magnetic tape handler equipment to decrease the access time to the data stored on magnetic tapes. At the present time, most computer systems with magnetic tape storage, including both continuous tapes and tape strips or cards, use the parallel method of storing data in which parallel data tracks are formed longitudinally on the magnetic tape in the process of recording characters. In each data track of a group of parallel tracks, a binary digit or bit of each character is recorded and each of the characters, which extend transversely to the length of the tape, may consist of six binary digits or bits in six parallel data tracks. Depending upon the width of the tape, one or more characters may be disposed in the respective parallel groups of data tracks extending longitudinally on the tape. In this manner, data in each group of six data tracks is recorded in a parallel-series arrangement wherein the six bits forming an individual character are disposed side by side on the tape for concurrent reproduction in parallel by passing the tape past six magnetic read heads disposed side by side to engage the tape along the respective data tracks. The six magnetic read heads are, in many instances, assembled in a multi-head unit. Also, it should be noted that the reproduction of the data in the magnetic tapes is often made by entirely different equipment than the equipment which has recorded the data.

The parallel method of operation in storing and reproducing characters is considered to be the most practical and effective manner in decreasing the access time to data stored on magnetic tapes. The principal limitation in the parallel method of storing and reproducing data is the problem of precise lateral alignment of the six magnetically recorded bits of a character on the tape in the six separate data tracks. Ideally, the lateral alignment of six bits of a magnetically recorded character on the record tape would be along a line perpendicular to the length of the tape, and during transfer, these six bits will be reproduced concurrently. In practice, however, mechanical and electrical tolerances in the construction of magnetic tape handler apparatus which store and reproduce data on magnetic tapes, produce lateral misalignment of the six transversely recorded bits of a character and misalignment in time of the six electrically reproduced bits of the respective character during data transfer. The mechanical tolerances contribute the most to the misalignment of the six bits of any one character. The misalignment of the six record heads and the tape during recording and the six read heads and the tape during reading, i.e., individual deviations of the six read heads and write heads from a line perpendicular to the length of the tape, produce misalignment in the form of skew of the six reproduced bits of a character. Misalignment of the gaps of the six read heads and write heads respectively, often referred to as "gap scatter" also produces misalignment of the six reproduced bits of a character. Progress has been made in decreasing the misalignment of the bits of character produced by skew and "gap scatter" by decreasing the mechanical tolerances of tape handler apparatus to provide better alignment of the heads and the tape and better alignment of the head gaps. Further improvements in the present equipment, which will produce a decrease in the misalignment of bits of a character by decreasing the mechanical tolerances, produce smaller returns for greater amounts of development effort and equipment cost.

Since further improvements in reduction of skew by decreasing mechanical tolerances are, in many instances, inadequate and too costly, an input register, often referred to as a "skew gate," has been employed which permits the temporary storage of all of the six reproduced bits of a single character, i.e., the register remains open sufficiently long to permit the storage of the six bits of a character for a time interval which is equal to a bit period plus the maximum relative time displacement between any two bits in any reproduced character passing through the register. A bit period is defined as the time period in which a bit is expected to be received in a system and the time period is dependent upon the rate of reproduction of the recording. When all the time displaced bits of a character are received in an input register, the bits of this character are transferred from the input register to receiving equipment of a computer or data processing system. A disadvantage of this arrangement is that it limits the data transfer rate to the maximum relative time displacement of two bits of any character on any tape whose data is to be transferred through the register and the time of operation of this register. Another disadvantage of this arrangement is that the compensation is limited to the bit period since only one reproduced bit can be stored in the register for each data track and the register cannot operate if more than one bit is received from one data track before a bit is received from the other data tracks.

The present invention avoids the foregoing difficulties and eliminates misalignment of reproduced bits of a character introduced by the magnetic tape handler apparatus or other equipment for reproducing data stored in parallel by a system of electronically controlled delays to provide for improved performance including an increased data transfer rate which decreases the data access time for magnetic recordings.

An object of the present invention is to provide a system having the foregoing features and advantages.

Another object of the present invention is the provision of a system for compensating for misalignment of data reproduced in parallel.

A further object is to provide a system for compensating for misalignment of bits of each character produced during the recording and reproducing the bits in parallel to provide concurrent reproduction of the bits of each character in parallel.

Still another object of the present invention is the provision of a system for automatically determining the misalignment of data reproduced in parallel whereby the proper amounts of delay are applied to provide concurrent reproduction of the data.

Figure 2B:
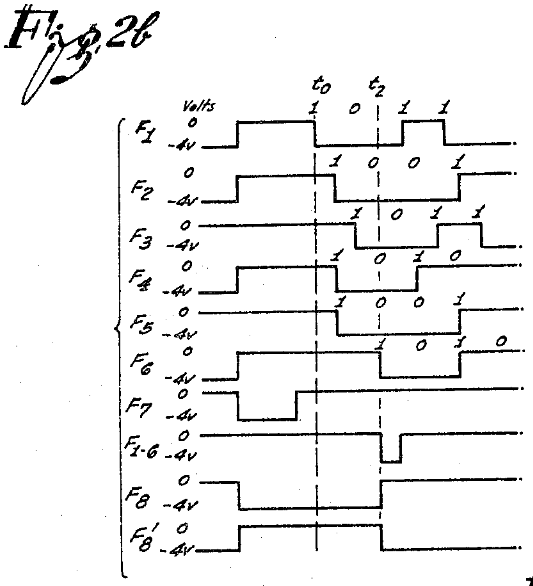
Figure 2A:
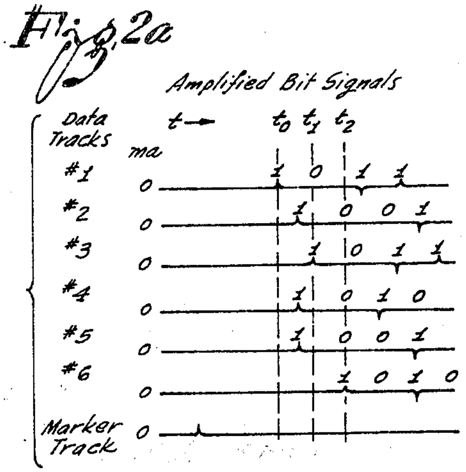
Figure 2D:
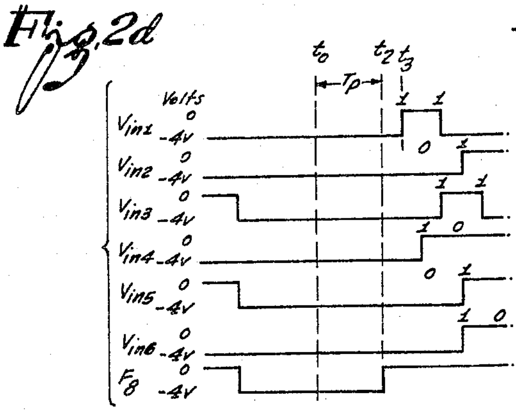
Figure 2C:
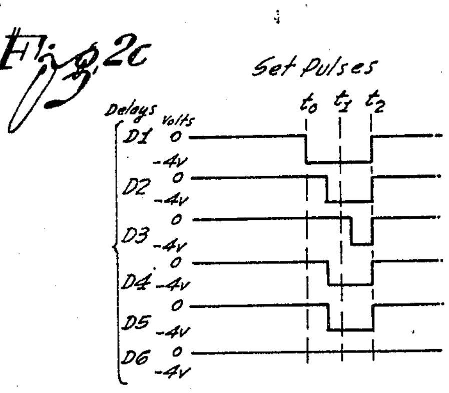
Figure 2E:
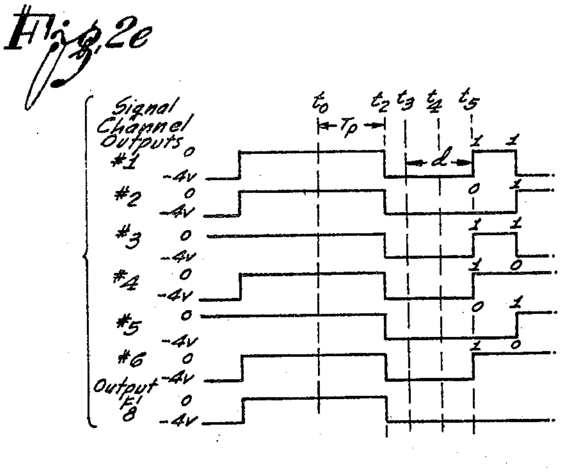
Figure 3:
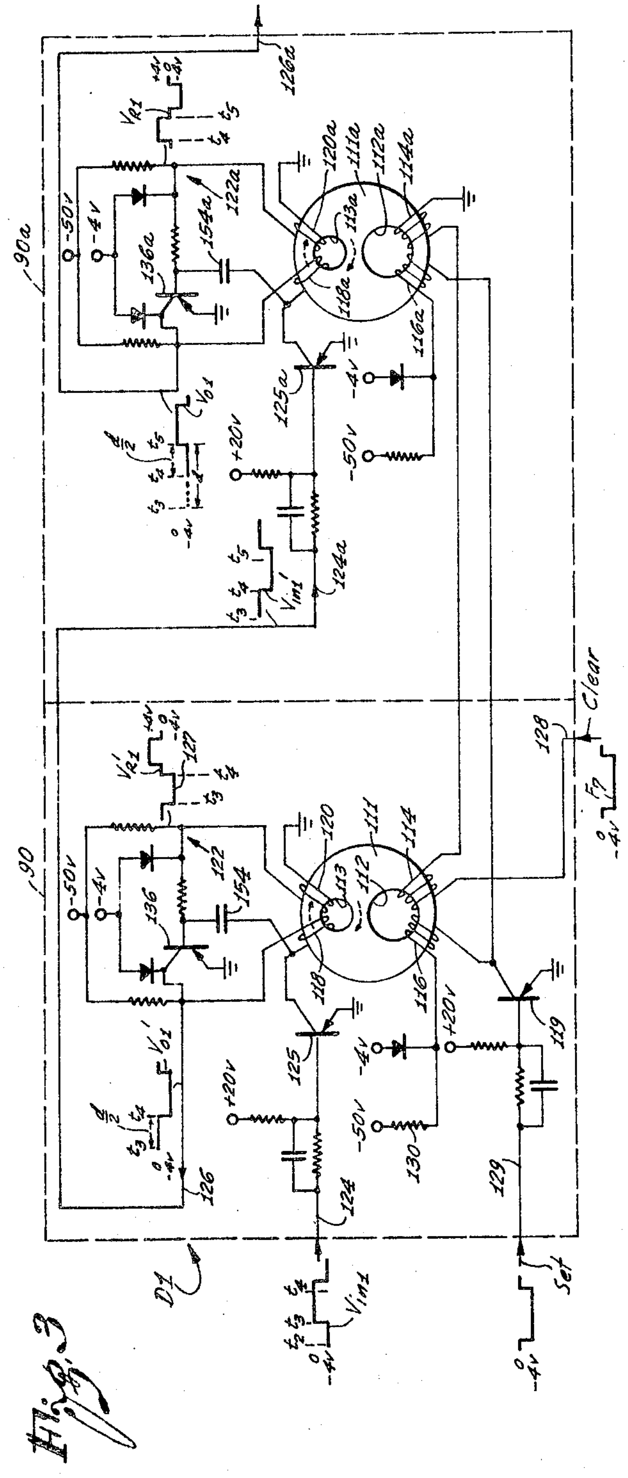
Figure 4B:
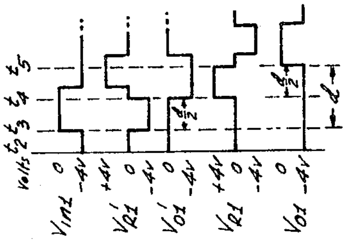
Figure 4A:
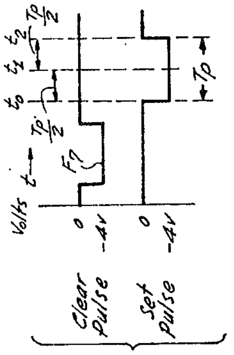

Other objects and advantages of the invention will hereinafter become more fully apparent from the following description of the annexed drawings, which illustrate a preferred embodiment, and wherein:

FIG. 1 is a schematic diagram, partially in block form, of the preferred embodiment of the present invention;

FIG. 1*a* is a schematic diagram of a typical magnetic recording which more clearly illustrates the skew found in recorded data;

FIG. 2*a* is a timing diagram showing typical waveforms of amplified bit signals reproduced from the magnetic tape shown in FIG. 1;

FIG. 2*b* is a timing diagram showing typical pulse waveforms on the outputs of the flip-flops shown in FIG. 1;

FIG. 2*c* shows waveforms of typical set pulses provided for setting the delay devices shown in FIG. 1;

FIG. 2*d* is a timing diagram showing typical signal waveforms applied to the inputs of the delay devices;

FIG. 2*e* is a timing diagram showing typical waveforms of concurrent output signals provided at the output of the delay devices;

FIG. 3 is a circuit diagram of a typical electronically controlled delay device, shown in block form in FIG. 1;

FIG. 4*a* shows typical signal waveforms produced to control the individual delay circuits of the delay device shown in FIG. 3; and FIG. 4*b* is a timing diagram showing typical signal waveforms for illustrating the operation of the individual delay circuits of the device shown in FIG. 3.

Referring now to the drawings, wherein like reference characters designate like or corresponding parts throughout the several views, there is shown in FIG. 1 which illustrates a preferred embodiment, a system for the concurrent reproduction of data stored in parallel data tracks #1 to #6 on a magnetic tape 10. The data on this tape 10 has been recorded in parallel by parallel recording heads (not shown) wherein one bit of each character is stored in a separate data track and the bits of a character must be reproduced concurrently to reproduce the character, i.e., all of the bits of a character must be reproduced at the outputs of the system before any bit of the character that follows.

In the diagrammatic showing in FIG. 1*a*, the data recorded in parallel tracks #1 to #6 of another data recording on the tape 10 clearly depicts, although exaggerated for illustration purposes, the misalignment of data in the parallel data tracks resulting from skew, indicated by the oblique dashed line 17. From the description of the invention which follows, it will be clear that misalignment of data resulting from skew, which has been more clearly depicted in FIG. 1*a*, is compensated for in the operation of the system along with other factors causing misalignment of data reproduced in parallel although the versatility of the system in compensating for the various factors combining to produce misalignment should be more apparent from the description of the system as illustrated in FIG. 1.

In FIG. 1, the present system is shown to include individual signal channels #1 to #6, corresponding to data tracks #1 to #6, respectively, for concurrently reproducing the bits of data of each character from the respective parallel data tracks #1 to #6 on the tape 10. The delay devices D1 to D6 in the signal channels #1 to #6, respectively, are controlled to provide variable time periods of delay to compensate for the misalignment of the data reproduced from the respective data tracks #1 to #6, as illustrated by typical waveforms in FIG. 2*d*, to produce concurrent reproduction of the data as illustrated by the typical pulse waveforms in FIG. 2*e*. In this manner, the bits of each character of data on the tape 10 are reproduced concurrently at the outputs of the system and the inputs to a data processor 22. The construction and arrangement of each of the individual signal channels #1 to #6 is the same. The signal channel #1 for data track #1, for example, comprises: a magnetic read head 12 disposed over the data track #1 for reproducing the data magnetically recorded thereon; an amplifier 14 for amplifying the data signal output of head 12; a flip-flop F1 for shaping the amplified data signals; and an electronically controlled delay device D1 having a set input for setting in the proper time period of delay and a data signal input 124. The bits of data of each character reproduced by the read heads 12 and amplified and shaped by amplifiers 14 and flip-flops F1 to F6 will not be applied concurrently to the data signal inputs 124 of delay devices D1 to D6, as illustrated in FIGS. 1 and 2*d*, because of the misalignment of the reproduced data. The data signals, applied to the signal inputs 124 of the delay devices D1 to D6, are delayed for their respective proper time periods, if necessary, to compensate for the misalignment of the data in the signal tracks #1 to #6 to produce concurrent reproduction of the bits of each character at the outputs **126*a***. The concurrent data signals for each character in the respective signal channels, as illustrated by typical signal waveforms in FIG. 2*e*, are coupled to the data processor 22 from the outputs **126*a* of the delay devices D1 to D6 through respective "and" gates 20**.

Referring now to FIG. 1 for a detailed description of the system, the section of the tape 10 is shown to have six parallel data tracks #1 to #6 extending along the length of the tape. The magnetically recorded bits "1" and "0" in these data tracks are shown schematically to clarify the description of the operation. The combination of corresponding bits, one from each data track, is a binary coded alphanumeric character except the first two bits of each data track which are preliminary bits, i.e., required preliminary bits "1" and "0," respectively, that are inserted prior to the data that follows in order to set up the proper time periods of delay in the delay devices D1 to D6. The misalignment of the corresponding bits of respective characters recorded on the tape 10, as shown schematically in FIG. 1, is representative for the purposes of explanation, of the relative misalignment of these corresponding bits and results, for example, from the combination of magnetic tape guide misalignment with record heads (not shown) and "gap scatter" of the record heads in a tape handler (not shown) during recording. As indicated by the arrows 13 and 15 in FIG. 1, the combination of the effects of tape guide misalignment producing skew and "gap scatter" of the record heads have produced approximately one-half bit space misalignment of bits in tracks #2, #3, and #5 as indicated by arrows 13 and approximately one and one-half bit spaces of bits in track #6 as indicated by arrow 15. These are some of the factors which result in non-concurrent reproduction of the bits of each character when reproduced by the read heads 12. "Gap scatter" of the read heads 12 and its effect in producing misalignment of the reproduced data will be described later.

Prior to reproduction of the data in data tracks #1 to #6, several preliminary operations are performed in the circuits of the signal channels #1 to #6 to prepare the circuits for the receipt of a separate recording of data. In a separate signal track 24 on the tape 10, a single record marker pulse is magnetically recorded prior to the bits in data tracks #1 to #6, as shown schematically in FIG. 1, to indicate that a block of data, i.e., separate recording of data, is to follow. The magnetic read head **22*a* is disposed over the signal track 24 to reproduce the marker pulse prior to the reproduction of the first of the recorded bits of a block including the preliminary bits iny any of the data tracks #1 to #6. As shown, in FIG. 1, the marker pulse is recorded in the signal track 24 approximately two bit spaces ahead of the first recorded bit in data track #1. In this manner, the marker pulse is reproduced sufficiently prior in time to the reproduction of the first bit in any of the data tracks #1 to #6 to provide for triggering of a monostable multivibrator F7 having an output $F_7$ which prepares certain circuits of the present system for the receipt of reproduced bits from the data tracks #1 to #6. For example, the output $F_7$ of flip-flop F7 is coupled to all of the reset inputs ${}_0f_1$ to ${}_0f_6$ which clears (resets) all of the pulse shaping flip-flops F1 to F6 prior to reproduction of bits in any of the data tracks #1 to #6**.

In an equally suitable manner, which has not been shown, the monostable multivibrator F7 can be triggered by the binary combination of bits "0" and "1" when separate recording tracks and signal channels are provided for parity and clock signals. In this arrangement, the presence of a parity check bit "1" in the parity track and the absence of a bit "1" in the clock track during the same bit period would occur prior to the data block at the time indicated for the marker pulse in FIG. 1. The outputs of pulse shaper flip-flops in these parity and clock signal channels (not shown), which shaper flip-flops would be the same as the pulse shapers F1 to F6 in FIG. 1, of true and false outputs, respectively, would produce a sum (through an "and" gate) for triggering the monostable multivibrator F7.

Another operation preliminary to the reading of the data in tracks #1 to #6 is the clearing of the delay devices D1 to D6, the detailed discussion of which will be set forth later in the description of the delay circuits for the delay device D1 shown in FIG. 3. At this point it will be noted only that the output $F_7$ is coupled to the clear inputs of delay devices D1 to D6, to clear the previous delay setting (if any) in the delay devices D1 to D6 prior to applying individual set pulses to the respective set inputs of delay devices D1 to D6. In still another preliminary operation, the output $F_7$ is coupled to the true input $f_8$ of a flip-flop F8 which triggers the flip-flop F8 into its true state to provide a true, low potential level at the output $F_8$ that is coupled to "or" gates 16 and to "and" gates 18 in signal channels #1 to #6. While the flip-flop F8 is in its true state, the true, low potential level output $F_8$ enables "and" gates 18 to pass individual set pulses, which may subsequently follow, to the respective set inputs of the delay devices D1 to D6. The "and" gates 20, connected to the output $F_8'$ of flip-flop F8, are closed by the false, high potential level signal shown in FIG. 2b to block possible extraneous noise in the outputs of delay devices D1 to D6 from entering the data processor 22 during the setting of the delay devices D1 to D6 prior to the receipt of data signals. The time period for preliminary operations including the time for setting the delay devices D1 to D6 to compensate for the misalignment of the reproduced data in tracks #1 to #6 is prior to the time $t_2$ indicated in FIGS. 1, 2b, and 2c.

Referring now to the reproduction of recorded bits in data tracks #1 to #6, the signal channels #1 to #6 for data tracks #1 to #6 are coupled to respective read heads 12 as shown in FIG. 1. The "gap scatter" of the read heads 12, which is one of the factors that contributes to the misalignment of the reproduced data signals, is illustrated in FIG. 1 by misalignment of any of the read heads 12 from a line perpendicular to direction of movement of the tape 10. As shown, middle read heads 12, which are disposed over data tracks #3 and #4, lag the other read heads 12 by approximately one-half of a bit space on the tape 10, i.e., one-half of the space occupied by a single recorded bit on the tape 10. The time displacement of bits during reproduction because of read head "gap scatter" contributes to the misalignment of the reproduce bits illustrated by the waveforms in FIGS. 1 and 2a. For example, the first recorded "1" bits in data tracks #1 and #4 are in alignment on the record tape 10, as shown in FIG. 1, and would be read concurrently but for the "gap scatter" of the read heads 12. Because of the "gap scatter" of read heads 12, the reproduced bits in the signal channel for data track #4 lag the reproduced bits in the signal channel for data track #1 by one-half of a bit time period which corresponds to the one-half bit space displacement of read head 12 for data track #4.

Having considered in detail some of the factors contributing to the misalignment of the data signals being reproduced in parallel, it should be noted that the system is inherently capable of compensating for misalignment of the reproduced signals as shown in FIG. 1a, whatever may be the cause thereof, since the compensation produced by the system is determined by the misalignment of the first "1" bits (preliminary bits "1") reproduced from data tracks #1 to #6. More particularly, the compensation, as determined by misalignment of the preliminary bits "1," is provided by the electronically controlled delay devices D1 to D6, for the respective signal channels #1 to #6. The delay devices D1 to D6 are set to delay all data bits except the latest reproduced bits of each character so that the bits of each character are produced concurrently at the input to the data processor 22. Prior to determining the compensation necessary to produce concurrent channel outputs of the reproduced bits of each character of the data, the recorded bits in data tracks #1 to #6 are amplified by read amplifiers 14 to produce signal currents illustrated in FIGS. 1 and 2a which are applied to the triggering inputs of pulse shaping flip-flops F1 to F6. The particular method of magnetically recording does not change the operation of the system except in the manner of pulse shaping by flip-flops F1 to F6. In the present arrangement, often referred to as a modified non-return-to-zero system of recording, a bit space in which a "1" bit is recorded, when reproduced by a read head 12, produces an output current in one direction and the next bit space in which a "1" bit is recorded produces an output current in the opposite direction. No output current is produced during reproduction when passing over a bit space on the tape 10 in which a "0" bit is stored. The bits reproduced from the tape 10 are shaped or reformed by the pulse shaper flip-flops F1 to F6.

In shaping the pulses in flip-flops F1 to F6, the flip-flops F1 to F6 are reset initially prior to receipt of signals from the read heads 12 by the true, low potential level output $F_7$ (FIG. 2b) which is applied to reset inputs $_0f_1$ to $_0f_6$ to trigger all of the flip-flops F1 to F6 into their false states as illustrated by the waveforms of outputs $F_1$ to $F_6$ in FIG. 2b. The resetting of flip-flops F1 to F6 is provided prior to reproduction of signals in a block of data such as, the block of data shown recorded on the tape 10 in FIG. 1. In the absence of the provision for resetting, flip-flops F1 to F6 could be in either state depending upon the last previous signals reproduced, e.g., the signals reproduced from the last prior block of data (not shown). The first bit in each of the data tracks #1 to #6, preliminary bit "1," produces positive-going signal current in the output of the respective amplifier 14 as shown in FIGS. 1 and 2a. The positive-going signal currents are coupled to the respective inputs $f_1$ to $f_6$, through diodes shown in FIG. 1, to trigger the flip-flops F1 to F6 from a false state to a true state at the times as shown by the waveforms in FIG. 2b.

The next preliminary bit recorded in each of the data tracks #1 to #6, the second bit recorded in each of the data tracks #1 to #6, is a "0" bit. Since there is no flux change on the tape 10, no signal output is produced during this bit period as illustrated by the waveforms in FIGS. 1 and 2a. Since there is no signal applied to flip-flops F1 to F6 during this bit period the flip-flops F1 to F6 remain in their true states as shown in FIGS. 1 and 2b.

The first bits of recorded data occur during the next bit spaces on the tape 10 which are the third bit spaces of data tracks #1 to #6. Generally, the first and second characters are the address of the data block, however, for purposes of explanation, these characters will be treated as data. The first six bits of parallel recorded data in data tracks #1 to #6 form the first binary coded alphanumeric character 101101. The first "1" bit of the first character of data is reproduced from data track #1 at time $t_3$ and is a negative-going signal current which is applied to the reset input $_0f_1$ of flip-flop F1 through a diode as shown in FIG. 1. The signal applied to the reset input $_0f_1$ triggers the flip-flop F1 into its false state to produce a high potential level output $F_1$, as shown by the waveform of $F_1$ in FIGS. 1 and 2a. In the same manner, but after time $t_3$, flip-flops F3, F4, and F6 are triggered into their false states by the amplified negative-going bit signals produced during the reproduction of the data bits of the first character recorded in data tracks #3, #4, and #6, as shown in FIGS. 1 and 2a, to produce high potential level outputs $F_3$, $F_4$, and $F_6$, as shown by the waveforms in FIGS. 1 and 2b. The bits of the first character in data tracks #2 and #5 are "0" bits, therefore, flip-flops F2 and F5 will not be triggered into their false states by the data bits of the first recorded character.

In the reproduction of the second character of data (111010), "1" bits of the second character in signal tracks #1 and #3 produce positive-going signal currents (FIGS. 1 and 2*a*) which are coupled to set inputs $f_1$ and $f_3$, respectively, to trigger flip-flops F1 and F3 into their true states producing true, low potential outputs $F_1$ and $F_3$, as illustrated by the waveforms in FIG. 2*b*. The "1" bits of the second character in signal tracks #2 and #5 produce negative-going signal currents (FIGS. 1 and 2*a*) which are coupled to reset inputs $_0f_2$ and $_0f_5$, respectively, to trigger flip-flops F2 and F5 into their false states producing false, high potential level outputs $F_2$ and $F_5$, as shown by the waveforms in FIG. 2*b*. This completes the reproduction of the second character since the remaining bits of the second character are "0" bits.

Having considered the operation of the pulse shaping flip-flops F1 to F6, the next operations to be considered are those which compensate for the misalignment of the reproduced data. The outputs of flip-flops F1 to F6 are coupled to logical gates 16 and 18 in their respective signal channels. The true outputs of flip-flops F1 to F6 resulting from preliminary bits "1" are coupled to the set inputs of the delay devices D1 to D6, respectively, through corresponding "and" gates 18 which have been previously enabled by the true low potential level output $F_8$ to produce set pulses illustrated by the waveforms in FIG. 2*c*. Each set pulse is started at such times as the respective flip-flops F1 to F6, produce true, low potential level outputs $F_1$ to $F_6$, respectively. The set pulses are terminated when all the outputs $F_1$ to $F_6$ are true, low potential level outputs. This is provided for in the system by coupling the outputs $F_1$ to $F_6$ to an "and" gate 26 which produces an output $F_{1-6}$ when all outputs of flip-flops F1 to F6 are true in response to the preliminary bits "1." As shown by the waveforms in FIGS. 2*b* and 2*c*, true low potential outputs $F_1$ to $F_5$ pass through respective "and" gates 18 until time $t_2$ when output $F_6$ changes to a true, low potential level. At time $t_2$, flip-flop F8 is triggered false by the output $F_{1-6}$ of "and" gate 26. When flip-flop F8 is triggered into its false state, "and" gates 18 are closed which terminates the set pulses shown in FIG. 2*c*. In accordance with the typical operation illustrated by the waveforms in FIGS. 1 and 2*b*, the flip-flop outputs $F_2$ to $F_5$ change from the false, high potential level to the true, low potential level at times later than the time $t_0$ and before the time $t_2$, and the flip-flop output $F_6$ changes from the false, high potential to the true, low potential level at the time $t_2$. The flip-flop output $F_6$ is the last output of outputs $F_1$ to $F_6$ to change from a false, high potential level to the true, low potential level and the flip-flop F6 is triggered by the last preliminary bit "1" to be read from the signal tracks #1 to #6. The last flip-flop output, upon changing to the true, low potential level, opens the "and" gate 26 to provide an output $F_{1-6}$, shown in FIG. 2*b*, which is coupled to the reset input $_0f_8$ of the flip-flop F8. The low potential output $F_{1-6}$ triggers the flip-flop F8 into the false state which removes the enabling signal from "and" gates 18 to terminate the set pulses (FIG. 2*c*) coupled to the respective set inputs of the delay devices D1 to D6 at the time $t_2$. The time periods of delay set into the respective delay devices D1 to D6, if any, are equal to the time period of the respective set pulses, as illustrated in FIG. 2*c*. As a result, the bits of data in signal channels #1 to #6 which are coupled to the respective signal inputs 124 of delay devices D1 to D6 after the time $t_2$ (FIG. 2*d*), will be delayed in the respective delay devices D1 to D6 according to the time periods of the respective set pulses.

The data bits, following the preliminary bits "1" and "0," are coupled to the signal inputs 124 of respective delay devices D1 to D6 through respective "or" gates 16, as illustrated by the waveforms in FIG. 2*d*. It will be noted in observing the waveforms in FIG. 2*d* that the signals $V_{in1}$ to $V_{in6}$ at the inputs 124 to the respective delay devices D1 to D6 remain at the true, low potential level when the output $F_8$ is at a true, low potential level. As a result the changes in potential level of the outputs of flip-flops F1 to F6 resulting from preliminary bits "1" are not applied to the signal inputs 124 of the delay devices D1 to D6. After compensation, the data outputs of the delay devices D1 to D6 are passed through the "and" gates 20 which are now enabled by the low potential level output $F_8'$. The concurrent bits of each character of data applied to the data processor 22 are shown in FIG. 2*e*.

In observing the illustration of the waveforms of the set pulses in FIGS. 2*c*, the signal inputs $V_{in1}$ to $V_{in6}$ in FIG. 2*d*, and the outputs of signal channels #1 to #6 in FIG. 2*e*, it should be noted that the earliest data bits in channel #1 are delayed in delay device D1 for the longest time period *d* which is equal to the time period $T_p$; the latest data bits in signal channel #6 are not delayed; and data bits in signal channels #2 to #5 are delayed by time periods, as shown, between zero (signal channel #6) and $T_p$ (signal channel #1) in order to be concurrently reproduced in the respective outputs 126*a* with the data bits of respective characters in signal channels #1 and #6.

The timing of bit periods is provided in the simplest manner by the data recorded and reproduced in which a bit "1" is recorded in at least one of the data tracks #1 to #6, that is, no alphanumeric data character is represented by the binary code 000000. In this manner, all the inputs to the data processor from the signal channels #1 to #6 are applied to an "or" gate (not shown) in the data processor 22. The output of the "or" gate provides a clock pulse each bit period.

The timing of bit periods may be provided in any one of a number of other conventional manners. A separate clock track (not shown) on the tape 10 and clock signal channel, for example, may be provided in which a bit "1" is recorded during each bit period except the second preliminary bit period of each block of data. In such a case, the clock signal channel is the same as any one of the signal channels #1 to #6. Data track #1, for example, in which all the bits in the track are bits "1," except the second bit of each block of data, is a suitable source of clock pulses for timing the bit periods of the reproduced data of 5 bit characters in signal channels #2 to #6.

In FIG. 3, a circuit diagram of the delay device D1 is shown. Since the delay devices D1 to D6, shown in FIG. 1, are identical in construction, the description of delay device D1 will present a complete understanding of the operation of the other delay devices D2 to D6. The delay devices D1, as shown in FIG. 3, comprises a series combination of two substantially identical, electronically controlled delay circuits 90 and 90*a* which together provide an adjustably variable time period of delay. Since the maximum misalignment of the parallel recorded bits of a character on the tape 10 has been shown in FIG. 1 as exceeding a single bit time period, which corresponds to a relative time displacement of bits of each character due to misalignment exceeding one bit space, each of the delay devices D1 to D6 is shown as being capable of being set to delay a series of bits of data in the respective signal channels #1 to #6 for two bit time periods.

Each of the electronically controlled delay circuits 90 and 90*a*, shown in FIG. 3, is capable of delaying a series of data bit pulses for an adjustably variable time period which does not exceed one bit period. A series combination of two of these circuits, such as shown in FIG. 3, is capable of delaying data bit pulses for an adjustably variable time period which does not exceed two bit periods. A series combination (not shown) of three delay circuits is capable of delaying data bit pulses for an adjustably variable time period which does not exceed three bit periods and so forth to the maximum number of bit periods of delay desired. For example, if the maximum relative time displacement of bits in the parallel signal channels, resulting from misalignment, exceeds two bit periods, a series combiantion of three or more delay circuits would be required wherein the number of circuits in series combination is equal to the maximum number of bit periods between any two parallel bits of a single character. If, however, the maximum time displacement of bits in parallel channels #1 to #6, resulting from misalignment, does not exceed one bit period, a single delay circuit in each signal channel, such as shown by the delay circuit 90, would be adequate to provide the necessary delay, and the series combination of delay circuits is only necessary when the relative time displacement resulting from misalignment exceeds one bit time period.

The connections of a series combination of the delay circuits of the delay device D1 shown in block form in FIG. 1 are shown in FIG. 3. The delay consists simply in connecting the output 126 of the individual delay circuit 90 to the input **124*a* of the delay circuit 90*a*. Also, the clear windings 114 and 114*a* of the respective delay circuits 90 and 90*a* are connected in series. However, the set windings 116 and 116*a* are shown connected in parallel to couple the set pulse to both of the delay circuits 90 and 90*a*. An individual delay circuit will now be described as illustrated by the delay circuit 90** in FIG. 3 and by typical waveforms illustrated in FIGS. 4*a* and 4*b*. The delay circuit 90 includes a multi-apertured core 111 having a high residual magnetism and a substantially rectangular hysteresis characteristic. The core 111 is provided with a major aperture 112 and a minor aperture 113. Wound about the outer leg of the major aperture 112 is a clear winding 114 and a set winding 116; and wound about the outer leg of the minor aperture 113 is a signal winding 118 and a reset winding 120. Connected to the set winding 116 is a transistor 119 which, in response to a set pulse applied on a set input line 129, completes a circuit from ground through the set winding 116 and through a current limiting resistor 130 to a −50 volt source. The collector circuit for the transistor 119, supplying current to the set winding 116, is clamped at −4 volts, as shown. Connected to include reset winding 120 is a reset circuit 122 which is also connected between ground and the −50 volt source. The circuit for the reset winding 120 is also clamped at −4 volts. Connected to one end of the signal winding 118 is a transistor 125 which, in response to a true, low potential level signal $V_{in1}$ applied on input line 124, provides a path from the ground through signal winding 118 to the −50 volt source. Connected to the other end of the signal winding 118, which is also clamped at −4 volts, is a signal output line 126.

In the operation of the delay circuit 90, a clear pulse $F_7$ (FIG. 4*a*), applied to the clear input 128 of clear windings 114 and **114*a*, initially saturates the core 111, and also a core 111*a* in the delay circuit 90*a* in one direction, as for example in a clockwise direction about the major apertures 112 and 112*a***, respectively. A predetermined volt-microsecond set pulse (FIG. 4*a*) then applied on the set signal input line 129, connected to the base of the transistor 119, causes the latter to conduct through the set winding 116, and also a set winding **116*a* in the delay circuit 90*a*, to partially reverse the flux in a counterclockwise direction about the major apertures 112 and 112*a***, respectively. Since the set pulse (FIG. 4*a*) is applied to both of the delay circuits 90 and **90*a*, the volt-microseconds of the set pulse results in storing flux in the paths about the minor apertures 113 and 113*a*, as illustrated by the arrows about these apertures. The amount of flux stored in this manner about the minor aperture 113 and the 2:1 turns ratio of the set winding 116 and the input winding 118** determines the time period of delay $d/2$ (FIG. 4*b*) of the circuit 90 which is one-half of the total time period of delay $d$ for both circuits 90 and **90*a*. The turns ratio of the set winding 116*a* and input winding 118*a* in the circuit 90*a*** is also 2:1 to provide a time period of delay of $d/2$.

It should be noted that a low potential level input signal $V_{in1}$ on the input line 124 "turns on" transistor 125 and the current supplied through this transistor reverses the flux stored about the minor aperture 113. At the time $t_3$ (FIG. 4*b*), when the input signal $V_{in1}$ on the input line 124 rises to the high potential level (0 v.), the reset circuit 122 which includes the reset winding 120 is effective to generate the negative portion 127 of a reset signal $V_{R1}'$ which again reverses the magnetic flux in the path about the minor aperture 113 and thereby resets the flux stored by the set pulse. The time required to reset the stored flux is equal to the time delay of the circuit 90, i.e., delay $d/2$, where delay $d$ is the total delay of both delay circuits 90 and **90*a***, as indicated in FIG. 4*b*. The reset circuit 122 is also connected to maintain conduction through transistor 136 while the negative pulse 127 of the reset signal $V_{R1}'$ is present. In this way, the leading edge of the signal $V_{O1}'$ on the output line 126 is delayed for the time period $d/2$ as shown in FIG. 4*b*. More particularly, the transistor 136 has its collector coupled to the output line 126 of the signal delay circuit, its emitter coupled to ground, and its base connected to the reset circuit 122. This arrangement provides for connecting the output line 126 to ground through an alternative path through the transistor 136 during the time period that the magnetic flux is being reset about aperture 113 of core 111. Thus, in response to the negative pulse 127 of the reset signal $V_{R1}'$, the output circuit 126 is coupled to the ground through this alternative path including the transistor 136.

At the time $t_4$, at the end of the negative pulse 127 of the reset signal $V_{R1}'$, an inactive time interval follows in which the signal input $V_{in1}$ remains at the high potential level. During this inactive time interval, between negative and positive pulses of the reset signal $V_{R1}'$, the transistor 136 is "turned off" and the output signal $V_{O1}'$ in the output line 126 immediately goes to the (clamped) low potential level (−4 v.). The fall in voltage to −4 volts corresponds to the leading edge of the input signal $V_{in1}$ which has been delayed by one-half of the total time interval $d$, i.e., delayed for the time interval $d/2$ between times $t_3$ and $t_4$.

The positive pulse of the reset signal $V_{R1}'$ is produced when the stored flux around the minor aperture 113 is reversed by the input signal $V_{in1}$ returning to the low potential level (−4 v.) after the time $t_4$. During this positive pulse of the reset signal $V_{R1}'$, the transistor 136 is biased further beyond cut-off and the output signal $V_{O1}'$ remains at the clamped voltage of −4 volts. After the positive pulse of the reset signal $V_{R1}'$, when the reversal of stored flux is completed, the fast drop in impedance in winding 118 causes a sudden increase in current from the ground through transistor 125 to the −50 volt source, which returns the output line 126 to the high potential level (0 v.) forming the trailing edge of the output signal $V_{O1}'$ that corresponds to the trailing edge of the input signal $V_{in1}$. The effect of this operation is that the negative-going edge of the signal $V_{in1}$ on the input line 124 is delayed in appearing on the output line 126 as a positive-going edge of the signal $V_{O1}'$ for a time interval which is dependent upon the amount of the magnetic flux reversal in the path around the minor aperture 113. Thus, it is only when all the stored flux about minor aperture 113 has been reversed, that the signal $V_{O1}'$ on the output line 126 abruptly swings to the high potential level of 0 volts. This signal on the output line 126 is then held at the high potential level of 0 volts by the conduction through the transistor 125 caused by the low potential level (−4 v.) of the input signal $V_{in1}$ on the input line 124.

During the time interval between the positive and negative pulses (not between negative and positive pulses) of the reset signal $V_{R1}'$, a connection is made to the ground via the transistor 136. This time interval is illustrated more clearly by the signal waveforms shown in conjunction with the delay circuit 90*a* although the same operation occurs in the delay circuit 90. Describing delay circuit 90, in this time interval, the base of the transistor 136 is coupled by a capacitor 154 to a lead connecting the collector of the transistor 125 to the signal delay winding 118. The capacitor 154 has such a response time that it develops a negative charge that is coupled to the base of the transistor 136 whereby this transistor is made conductive to couple the output line 126 of the delay circuit 90 to ground through transistor 136. As a result of this coupling, the output signal $V_{O1}'$ will not follow the input signal $V_{in1}$ during the interval between the positive and negative pulses of the resetting signal $V_{R1}'$. The transistor 136 remains conductive by the charge on capacitor 154 until the negative pulse of the reset signal $V_{R1}'$ takes over to maintain conduction through the transistor 136, and therefore maintain connection of the output circuit to the ground through the alternative path. The delay circuit 90*a* delays the signal input $V_{in1}'$ for a time period $d/2$ between times $t_4$ and $t_5$ (FIG. 4*b*) to complete the total delay $d$ of the input signal $V_{in1}$ to produce the delayed output $V_{O1}$ on the output line 126*a*.

In a similar manner, all subsequent signals $V_{in1}$ coupled to the input line 124 of the delay device D1 are delayed for the time interval determined by the set signal, until a clear signal is applied to the clear input 128. Also, in a similar manner the signal inputs $V_{in2}$ to $V_{in6}$ (FIG. 2*d*) are delayed in delay devices D2 to D6 respectively for a time period indicated by the respective set pulses for delay devices D2 to D6 shown in FIG. 2*c*. For a more detailed description of the adjustable electronically controlled delay circuit of the type described, reference is made to a copending U.S. application of Richard K. Gerlach et al., Serial No. 828,910, filed July 22, 1959.

In the light of the above teachings, various modifications and variations of the present invention are contemplated and will be apparent to those skilled in the art without departing from the spirit and scope of the invention.

What is claimed is:

1. A system for concurrent reproduction of parallel signals comprising: parallel signal channels including means for receiving misaligned parallel signals, each of said signal channels including delay circuit means for producing an adjustable time period of delay for signals in the respective signal channel according to the time period of a set pulse; and control circuit means coupled to each of said parallel signal channels to be responsive to each of said misaligned parallel signals for producing individual set pulses for said signal channels, said set pulses having respective time periods corresponding to the relative time displacement of the misaligned parallel signals; and means applying said set pulses to respective ones of said adjustable delay circuit means, said delay circuit means being responsive to said set pulses to set constant time periods of delay for signals in the respective signal channels according to the time duration of the individual set pulses applied thereto to provide concurrent outputs of said parallel signals.

2. In a system for concurrent reproduction of binary signals for each character recorded in a multiplicity of parallel data tracks of a record block on a magnetic tape, the combination comprising: a signal channel for each data track for reproducing the binary signals in the respective data track; adjustable delay circuit means in each signal channel for delaying the binary signals reproduced in the respective channel for a constant time period during said record block to provide concurrent reproduction of binary signals of each character of the record block; and control circuit means having inputs coupled to said signal channels for determining the relative time displacement of the first binary signals of the record block and producing set pulses for respective signal channels according to said time displacement, all of said set pulses terminating upon receiving all of said first binary signals of the record block and outputs coupling said set pulses to the respective signal channel adjustable delay circuit means, said delay circuit means being responsive to the respective set pulses to adjust and retain the constant time periods of delay at least for the entire time interval in which the binary signals of all the characters of the data block are reproduced in the respective signal channels to provide concurrent reproduction of said binary signals for each character reproduced from said record block.

3. The system according to claim 2 in which said adjustable delay circuit means for each signal channel includes a plurality of individual delay circuits connected in series whereby said series of individual delay circuits provides delay for time periods in which more than one binary signal is reproduced from any one of the parallel data tracks of said record block because of the relative time displacement of the reproduced signals for each character.

4. The system according to claim 3 in which the number of said individual delay circuits connected in series is equal to the maximum number of signals reproduced from any one of the parallel data tracks during the time period of delay which is provided because of the relative time displacement of the reproduced signals for each character.

5. A system for concurrent reproduction of binary signals of each character recorded in multiple parallel data tracks and in data blocks on a magnetic tape comprising: a signal channel for each data track for reproducing the binary signals recorded in the respective data track; adjustable delay circuit means for each signal channel for delaying the binary signals in the respective signal channel to provide concurrent reproduction of the binary signals of each character in each of said data blocks, each of said delay circuit means including means for adjusting its time period of delay according to the time period of a timing control signal; and timing control circuit means coupled to said signal channels for determining the misalignment of the first binary signals reproduced from the data tracks of each of said data blocks and producing individual timing control signals at the beginning of said data blocks for each signal channel which timing control signals vary in time duration according to the misalignment of the first binary signal in each signal channel, said timing circuit means having individual outputs coupled to respective delay circuit means for coupling the respective timing control signals produced at the beginning of each of the data blocks to said delay circuit means, said delay circuit means in the respective signal channels being responsive to the respective timing signals supplied at the beginning of each data block to adjust and retain the respective time periods of delay of said delay circuit means for the respective data blocks, whereby the binary signals of each character are reproduced concurrently in each data block.

6. The system according to claim 5 in which a signal recorded on said magnetic tape between data blocks is reproduced prior to the binary signals in the following data block and coupled to the adjustable delay circuit means to clear the delay from the delay circuit means prior to adjustment of the time period of delay for said following data block.

7. A system for concurrent reproduction of parallel binary signals forming each character from parallel data tracks on a magnetic tape comprising: multiple signal channels including magnetic sensing means disposed over said parallel data tracks for reproducing said binary signals recorded thereon, pulse shaping means coupled to said magnetic sensing means to produce parallel true and false logical potential level outputs in response to said reproduced binary signals, and adjustable delay circuit means coupled to said pulse shaping means for adjustably delaying changes in the true and false potential level outputs to provide concurrent reproduction of said outputs forming each character; each of said adjustable delay circuit means including variable means for adjusting its time period of delay according to the time period of a set signal, said variable means having a set input coupled to said pulse shaping means to be responsive to the first change in potential level of said pulse shaping means, resulting from said reproduced binary signals, to produce a set signal beginning with said change in potential; and control circuit means having an input coupled to the outputs of said pulse shaping means to be responsive to the first change in logical potential level of all of said pulse shaping means to produce an output signal for blocking said set input whereby set signals for each of said delay circuit means are terminated and the adjustable delay circuit means in each signal channel delays the changes in logical potential level for each character according to the time period of the respective set signals to produce concurrent reproduction of parallel binary signals for each character.

8. A system for concurrent reproduction of a series of groups of misaligned parallel binary signals of first and second signal levels comprising: individual means including parallel signal channels for binary signals applied to respective signal channels; adjustable delay circuit means for each signal channel for delaying the binary signals in the respective signal channels for predetermined time periods to provide concurrent eproduction of said parallel binary signals, said delay circuit means comprising a magnetic core having a major aperture and a minor aperture and a high residual magnetism and a substantially rectangular hysteresis characteristic, a signal winding threaded through said major aperture for receiving said binary signals and a set winding for receiving set pulses; and timing control circuit means coupled to said signal channels for determining the misalignment of the parallel binary signals and producing individual set pulses for said signal channels which set pulses vary in volt-microseconds according to the misalignment of the first group of parallel binary signals of said series applied to said signal channels, said timing control circuit means having individual outputs coupled to the set windings of respective delay circuit means for coupling the set pulses for respective signal channels to said set windings, said delay circuit means in the respective signal channels being responsive to the respective set pulses to adjust and retain the respective predetermined time periods of delay whereby the binary signals of respective groups of parallel binary signals are reproduced concurrently.

9. The system according to claim 8 in which said adjustable delay circuit means includes a clear winding that is threaded through said major aperture and a clear signal is applied to said clear winding before said set pulses are applied to said set windings to clear any previous delay settings of said delay circuit means.

10. The system according to claim 8 in which said adjustable delay circuit means for respective signal channels includes a reset winding threaded through said minor aperture to reset the delay in the minor aperture after each of said parallel binary signals of said series of groups following said first group.

11. In a system for concurrent reproduction of separate groups of parallel binary signals read from parallel data tracks on a record medium including a separate data channel for each of said data tracks comprising: first means including an individual variable delay device in each data channel; second means for detecting a reference signal recorded in each data track; and third means having inputs coupled to said second means and outputs coupled to respective delay devices for setting each of said delay devices to delay the binary signals in the corresponding channel by the time interval between the detection of said reference signal recorded in the respective data track and a reference instant occurring after the detection of all the reference signals recorded in all said data tracks whereby the parallel binary signals of respective groups are reproduced concurrently in said data channels.

12. In a system for concurrent reproduction of separate groups of parallel binary signals read from parallel data tracks on a record medium including a separate data channel for each of said data tracks comprising: first means including an individual variable delay device in each data channel; second means for detecting a reference signal recorded in each data track; third means having inputs coupled to said second means and outputs coupled to respective delay devices for setting each of said delay devices to delay the binary signals in the corresponding channel by the time interval between the detection of said reference signal recorded in the respective data track and a reference instant occurring after the detection of all said reference signals recorded in all said data tracks whereby the binary signals of respective groups are reproduced concurrently in said data channels; and fourth means including means for detecting a marker signal, preceding the reference signals, in a marker track on said record medium to produce a output signal and coupled to said delay devices, said delay device including means responsive to said output signal to clear any previous delay settings therein in preparation for setting of the respective delay devices in accordance with said reference signals.

References Cited by the Examiner

UNITED STATES PATENTS

| | | | |
|---|---|---|---|
| 2,793,344 | 5/1957 | Reynolds | 340—174.1 |
| 2,813,259 | 11/1957 | Burkhart | 340—174.1 |
| 2,828,478 | 3/1958 | Johnson | 340—174.1 |
| 2,842,756 | 7/1958 | Johnson | 340—174.1 |
| 2,972,736 | 2/1961 | Hersh | 340—174.1 |
| 3,076,183 | 1/1963 | Willoughby | 340—174.1 |
| 3,103,000 | 9/1963 | Newman | 340—174.1 |

FOREIGN PATENTS

| | | |
|---|---|---|
| 809,849 | 3/1959 | Great Britain. |

BERNARD KONICK, *Primary Examiner.*

IRVING L. SRAGOW, *Examiner.*

R. M. JENNINGS, A. I. NEUSTADT, *Assistant Examiners.*